US012632797B2

(12) United States Patent

Potukuchi et al.

(10) Patent No.: US 12,632,797 B2

(45) Date of Patent: May 19, 2026

(54) MATCH CLASSIFICATION BASED ON ENSEMBLE MODELING

(71) Applicant: MASTERCARD INTERNATIONAL INCORPORATED, Purchase, NY (US)

(72) Inventors: Srikanth Potukuchi, Ancaster (CA); Ravi Santosh Arvapally, Hyderabad (IN); Herve Dukuze, North York (CA); Ahmed Menshawy, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 573 days.

(21) Appl. No.: 18/315,622

(22) Filed: May 11, 2023

(65) Prior Publication Data

US 2024/0378510 A1 Nov. 14, 2024

(51) Int. Cl.
*G06N 20/20* (2019.01)

(52) U.S. Cl.
CPC .................................... *G06N 20/20* (2019.01)

(58) Field of Classification Search
None
See application file for complete search history.

(56) References Cited

U.S. PATENT DOCUMENTS

| | | | | |
|---|---|---|---|---|
| 8,732,183 | B2 * | 5/2014 | Soel | G06F 40/194 |
| | | | | 707/758 |
| 10,380,248 | B1 * | 8/2019 | Lai | G06F 16/955 |
| 12,197,484 | B2 * | 1/2025 | Grinis | G06F 16/358 |

| | | | | |
|---|---|---|---|---|
| 2009/0006394 | A1 * | 1/2009 | Snapp | G06F 16/284 |
| 2009/0094154 | A1 * | 4/2009 | Del Callar | G06Q 20/10 |
| | | | | 705/30 |
| 2013/0246047 | A1 * | 9/2013 | Vassilieva | G06F 40/295 |
| | | | | 704/9 |
| 2017/0091567 | A1 * | 3/2017 | Wang | A61B 5/681 |
| 2019/0172159 | A1 * | 6/2019 | Sun | G06Q 30/018 |
| 2021/0287069 | A1 * | 9/2021 | Mumcuyan | G06N 3/048 |
| 2021/0304121 | A1 * | 9/2021 | Lee | G06F 16/215 |
| 2021/0374187 | A1 * | 12/2021 | Miller | G06F 16/3347 |
| 2022/0012550 | A1 * | 1/2022 | Ben-Itzhak | G06F 18/2185 |
| 2023/0394352 | A1 * | 12/2023 | Byrne | G06F 18/2431 |
| 2024/0220511 | A1 * | 7/2024 | Shukla | G06F 16/285 |

FOREIGN PATENT DOCUMENTS

| | | | | | |
|---|---|---|---|---|---|
| CN | 113554178 A | * | 10/2021 | ....... | G06F 18/24323 |

* cited by examiner

*Primary Examiner* — Hasanul Mobin

(74) *Attorney, Agent, or Firm* — Pillsbury Winthrop Shaw Pittman LLP

(57) ABSTRACT

The disclosure relates to methods and systems of match classification based on ensemble modeling. Match classification based on ensemble modeling is a prediction that two or more data records match or mismatch one another based on the output of two or more classifiers trained to make this prediction. A first match classifier may include an ensemble of decision trees, which may be trained via gradient boosting, and in particular using extreme gradient boosting to generate a first match classification. The first match classifier, which is itself an ensembled model, may be ensembled together with at least a second match classifier trained via weak supervision to generate a second match classification, which may be aggregated with the first match classification. The aggregated classification may be used to determine whether or not two or more match candidates match one another.

20 Claims, 6 Drawing Sheets

400

ACCESS A FIRST MATCH CANDIDATE AND A SECOND MATCH CANDIDATE
402

GENERATE, BASED ON THE FIRST MATCH CANDIDATE AND THE SECOND MATCH CANDIDATE, ONE OR MORE FIRST FEATURES AND ONE OR MORE SECOND FEATURES
404

CLASSIFY, BY A FIRST MATCH CLASSIFIER, THE FIRST MATCH CANDIDATE AND THE SECOND MATCH CANDIDATE INTO A FIRST MATCH CLASSIFICATION THAT INDICATES WHETHER A MATCH OR MISMATCH IS PREDICTED BETWEEN THE FIRST MATCH CANDIDATE AND THE SECOND MATCH CANDIDATE BASED ON THE ONE OR MORE FIRST FEATURES
406

CLASSIFY, BY A SECOND MATCH CLASSIFIER, THE FIRST MATCH CANDIDATE AND THE SECOND MATCH CANDIDATE INTO A SECOND MATCH CLASSIFICATION THAT INDICATES WHETHER THE MATCH OR MISMATCH IS PREDICTED BETWEEN THE FIRST MATCH CANDIDATE AND THE SECOND MATCH CANDIDATE BASED ON THE ONE OR MORE SECOND FEATURES
408

GENERATE AN AGGREGATE MATCH CLASSIFICATION BASED ON THE FIRST MATCH CLASSIFICATION AND THE SECOND MATCH CLASSIFICATION
410

DETERMINE THE FIRST MATCH CANDIDATE AND THE SECOND MATCH CANDIDATE ARE MATCHED BASED ON THE AGGREGATE MATCH CLASSIFICATION
412

*FIG. 4*

MATCH CLASSIFICATION BASED ON ENSEMBLE MODELING

BACKGROUND

Machine learning models such as classifiers trained on a corpus of training data can be powerful at making predictions using input data. However, classifiers that are trained using various machine learning techniques may be prone to training and execution errors due to data variability in the training data or input data. This data variability can be caused by errors in the data, unstructured content in the data, and/or other reasons. Data variability may result in inaccurate results particularly when a single classifier is trained and executed to make predictions on input data that exhibits such variability. For example, single classifiers may be sensitive to high variance, low accuracy, and feature noise and bias. These and other issues may exist with machine learning models.

BRIEF DESCRIPTION OF THE DRAWINGS

Features of the present disclosure may be illustrated by way of example and not limited in the following figure(s), in which like numerals indicate like elements, in which:

FIG. 4 illustrates an example of a method of match classification based on ensembling an ensemble of models and at least one other model;

DETAILED DESCRIPTION

Figure 1:
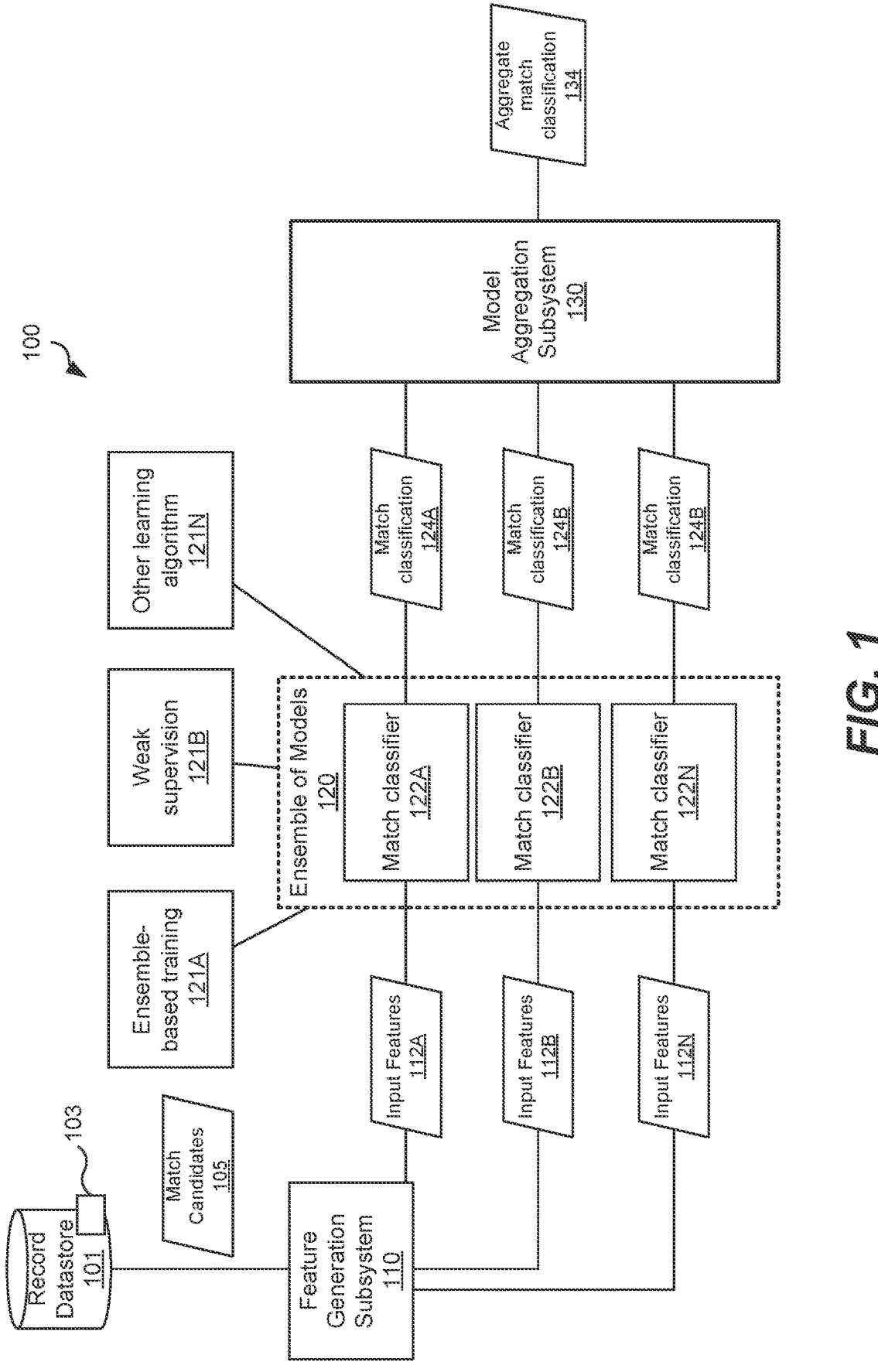
FIG. 1 illustrates an example of a system environment for match classification based on ensemble modeling.

The disclosure relates to methods and systems of match classification based on ensemble modeling. Match classification based on ensemble modeling is a prediction that two or more data records match or mismatch one another based on the output of two or more classifiers trained to make this prediction. The two or more data records may be referred to herein as match candidates. Each of the match candidates may include a string of characters. For training and executing the ensembled classifiers, features may be derived from the match candidates. For example, the features may include similarity metrics that estimate the similarity between the strings of the match candidates.

Each string of characters may include unstructured content that may result in high feature variability. For example, one pair of strings to be compared may have a typographical error while another pair of strings may have translocated data elements with respect to one another. Other pairs strings may have other types of variability, such as missing or added elements with respect to the other string. These and other types of variability will result in feature variability when similarity metrics are used. Feature variability may result in bias during training, which may be especially problematic when using a single classifier.

For example, a single classifier may be sensitive to feature variability due to over-fitting or under-fitting of the training data, resulting in learned features that do not fully address the range of variability in real-world data records. Another issue that may arise is that a single classifier may rely on a subset of features, which makes the classifier prone to feature noise and bias. For example, the variability of the strings may result in inaccurate learned features because feature noise may mask reliable features such as by training the match classifier to ignore features that may reveal typographical errors that are mistaken for a mismatch. Feature noise may also cause bias toward unreliable features, such as by training the match classifier to trust exact match features that would characterize typographical errors as a mismatch.

To address the foregoing issues with machine learning models, a system may ensemble match classifiers that are each trained in different ways. At least a first match classifier from among the ensembled match classifiers may itself be an ensemble of models. For example, the first match classifier may include an ensemble of decision tree models. In these examples, the system may implement ensemble modeling that trains and ensembles (i) an ensemble of models and (ii) at least one other model.

The ensemble of decision tree models, such as a first match classifier, may be trained via supervised learning techniques in which a training dataset is labeled by subject matter experts (SMEs). The training dataset may include multiple labeled datapoints. Each labeled datapoint is associated with a set of two or more (such as pairs) of match candidates. SMEs may assign each set of match candidates with a label indicating a match or mismatch. Thus, each labeled datapoint may be associated with either a match label or a mismatch label. Each decision tree may be trained based on the labeled datapoints. For example, each decision tree may implement a series of nodes that form a decision tree. Each node in the decision tree may be associated with a split that determines traversal down the nodes of the decision tree. Each split may include conditional logic that dictates the direction of traversal down the decision tree. The conditional logic may evaluate features derived from each of the match candidates. For example, during training, the labeled datapoints may be used to construct the decision trees. In particular, features derived from the set of match candidates of each labeled datapoint may be used as criteria for the conditional logic. Each decision tree is traversed through the nodes based on the node's associated conditional logic until a leaf node is reached. The leaf node may represent a match classification. Thus, based on traversal down each decision tree, each decision tree will generate a respective match classification. The respective match classifications may be aggregated together to generate a first match classification.

To improve performance, the decision trees may be gradient boosted. In gradient boosting, a loss function such as gradient descent is used to minimize errors between sequentially trained decision trees. The decision trees may be sequentially trained based on the labeled training dataset. For example, a first decision tree may be trained based on at least a subset of the features from the labeled training dataset. The first set of samples may be randomly selected from the training dataset. An error function may estimate the residual $(R_1)$, or error, from the first decision tree. The system may provide $R_1$ back to the first decision tree for adjusting its node evaluations and provide $R_1$ for training a second decision tree using a different set of samples from the training dataset. That is, the second decision tree may be trained after the decision tree based on the residual from $R_1$. Each decision tree attempts to correct the error ($R_{1-N}$) of a previously trained decision tree, which uses a different subset of the labeled training dataset and may use a different set of features. For example, the second decision tree may result in a residual $R_2$, which is fed back to the decision trees for adjusting their node evaluations. This process may continue to train the decision trees until a minimum loss is achieved (which may be predefined), when the decision trees accurately predict the expected match classifications is achieved, and/or when a maximum number of iterations configured by a user has been met.

Each decision tree may be trained on its specific dataset and/or set of features, enabling the decision trees to complement one another as well as learn from their errors. For example, while a similarity metric such as edit distance may be good at measuring similarity of strings even with typographical errors or omitted portions of strings, a direct match feature may be too stringent for similarity detection in some instances. Thus, some features will perform well for some datasets but not others. Gradient boosting and XGBoost in particular may mitigate against the variance by tuning an ensemble of decision trees that each are fine-tuned by iterative and sequential training on different subsets of the training data, in which each subset exhibits different variation characteristics.

The ensemble of decision trees from gradient boosting and XGBoost in particular may be ensembled with at least one other second model, such as a second match classifier. The second match classifier may be trained via weak supervision. Weak supervision is an approach to machine learning in which labeled training sets are generated through one or more labeling functions instead of manual annotation by SMEs. Weak supervision may yield more scalable, faster labeling and discovery of potentially important features that correlate with matches or mismatches. Labeling functions may be provided to platforms that facilitate learning based on weak supervision, such as SNORKEL, UIPATH, and V7, among others.

A labeling function is computational logic that evaluates input data and assigns a label to the input data based on the evaluation. The label may include a match label corresponding to a match class or a mismatch label corresponding to a mismatch class. Each labeling function may specify criteria used to identify a label for that input data. To leverage weak supervision, a plurality of labeling functions may be used in combination with one another to train a label model. The label model may take as input each data point (such as pair of match candidates) of an unlabeled training dataset and output a label for that data point. Each labeling function may use a different set of criteria to evaluate unlabeled training data. The criteria may include a threshold or other attribute test for similarity metrics and/or other features derived from the pair of match candidates. The variability of output labeling enables the label model to discover features that may be important for match classification, improving the performance of the second match classifier. The label model may rapidly label training data from an unlabeled training dataset.

The ensembled first and second match classifiers may each classify match candidates. For example, each match classifier may generate a match classification that predicts whether the match candidates match one another. The system may ensemble the first and second match classifiers by aggregating their respective match classifications to determine an aggregate match classification. By ensembling a plurality of match classifiers (at least one of which may itself be an ensemble model), the system may specifically address the problem of data variability in training and input data such as errors and/or unstructured content by leveraging and combining both SME in labeled training datasets and automatically discovered labels via weak supervision. For example, the first classifier is itself an ensemble model that may search through multiple permutations of features such as similarity metrics between strings to determine match classifications. The second classifier may be trained with automatically labeled features that enable discovery of important features that may be predictive of matches as well as generating large, labeled datasets to validate the match classification of the first match classifier.

Having described a high-level overview of system operations and example use of the system, attention will now turn to an example of a system environment for match classification. For example, FIG. 1 illustrates an example of a system environment 100 for match classification based on ensemble modeling.

The system environment 100 may include a record datastore 101, a feature generation subsystem 110, an ensemble of models 120 comprising two or more match classifiers 122 (illustrated as match classifiers 122A-N), a model aggregation subsystem 130, and/or other features. Each of the features 110, 120, 130 may be implemented in hardware and/or software. For example, each of the features 110, 120, 130 may be together or separately implemented by some or all of the computer system illustrated in FIG. 6.

The record datastore 101 may store a plurality of data records 103. Each data record 103 may include a match candidate 105, which is a string of characters that identify or otherwise describe an entity. The match candidate 105 may include unstructured text and/or contain errors such as typographical errors. In these instances, the match candidate 105 may introduce variability in the training data used to train the match classifiers 122 and/or the input data used to make match classifications 124. The plurality of data records 103 may be used as a training dataset to train one or more of the match classifiers 122.

Feature Generation

The feature generation subsystem 110 may generate features for training and executing one or more of the match classifiers 122. For example, the feature generation subsystem 110 may generate features 112 by computing similarity metrics between two match candidates. The feature generation subsystem 110 may generate a feature vector based on the similarity metrics. A feature vector is a numerical representation of the similarity metrics ordered in a way that the match classifier 122 can apply consistently during training and execution. For example, the feature vector may be an N-dimensional vector (such as an N-dimensional array) of N-values in which N is the number of similarity metrics computed between the pair of input strings.

| Feature Number | Feature Name | Feature Description |
|---|---|---|
| 1. | Edit Distance such as Levenshtein distance | The number of characters that need to be substituted, inserted, or deleted, to transform s1 into s2 |
| 2. | Jaccard Distance | Distance metric comparing set-similarity. Lower score is better. |
| 3. | Jaro Similarity | The Jaro Similarity between is the min no. of single-character transpositions required to change one word into another. |
| 4. | Jaro Winkler Distance | The Jaro Winkler distance is an extension of the Jaro similarity |

-continued

| Feature Number | Feature Name | Feature Description |
| --- | --- | --- |
| 5. | Cosine Distance | Compute the Cosine distance between 1-D arrays. |
| 6. | Direct Match | Check if all characters match and return 0 or 1(match). |
| 7. | Common Special Chars Count | Common special characters. |
| 8. | Longest Subsequence | Length of longest common substring. |
| 9. | Common Bigrams Count | Common substrings of length 2. |
| 10. | Common Trigrams Count | Common substrings of length 3. |
| 11. | Difference in Length | Difference between length of 2 strings |
| 12. | Acronym Match | Checking if first character from each word/string is a match. |
| . . . | . . . | . . . |

Ensemble Modeling

Each of the match classifiers 122A-N may generate respective match classifications 124A-N. For example, match classifier 122A may generate a match classification 124A that represents a first match prediction by the match classifier 122A. Similarly, match classifier 122B may generate a match classification 124B that represents a second match prediction by the match classifier 122B, and/or another match classifier 122N may generate a match classification 124N that represents another prediction by the match classifier 122N. The match classifications 124A-N may each include a one-class classification (either match or mismatch) or a binary classification (match or mismatch). In some examples, the match classifications 124A-N may each include a regressive classification that indicates a probability of a match and/or mismatch.

A one-class classification includes only a single class: either match or mismatch. A binary classification includes two classes: a match class and a mismatch class. Thus, the binary classification may be a yes/no, 0/1, or other binary indication of whether a match is predicted between two or more match candidates. In some examples, the binary classification may include a first probability that two or more match candidates are matched and a second probability that that two or more match candidates are not matched. In these examples, generally, though not necessarily, the first and second probabilities may sum to a value indicating a 100% probability, although deviations may occur due to error. The determination of whether two or more match candidates are matched may be based on a higher one of the first probability or the second probability.

Figure 2:
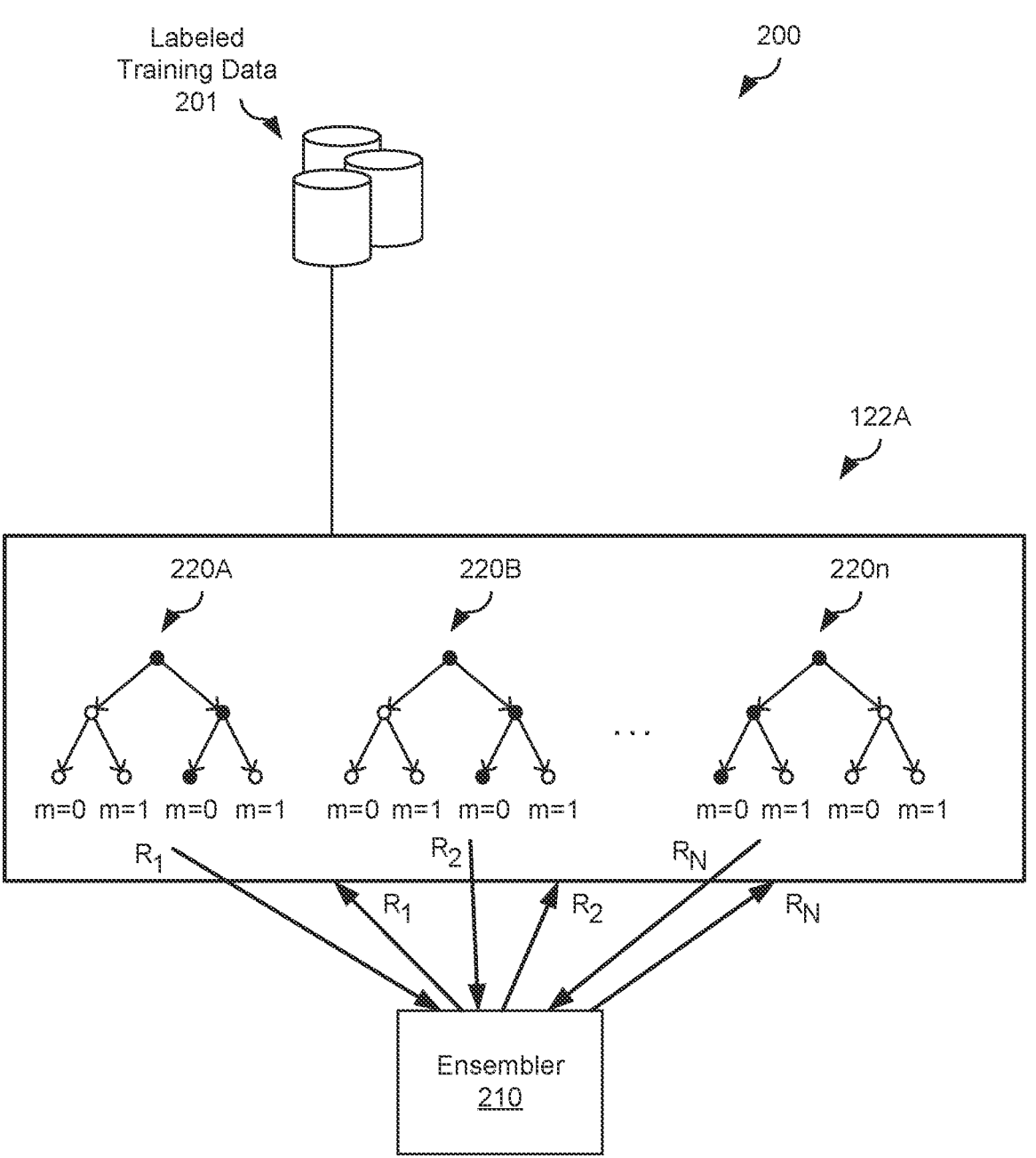
FIG. 2 illustrates a schematic example of a match classifier trained and executed via ensemble modeling.
Figure 3:
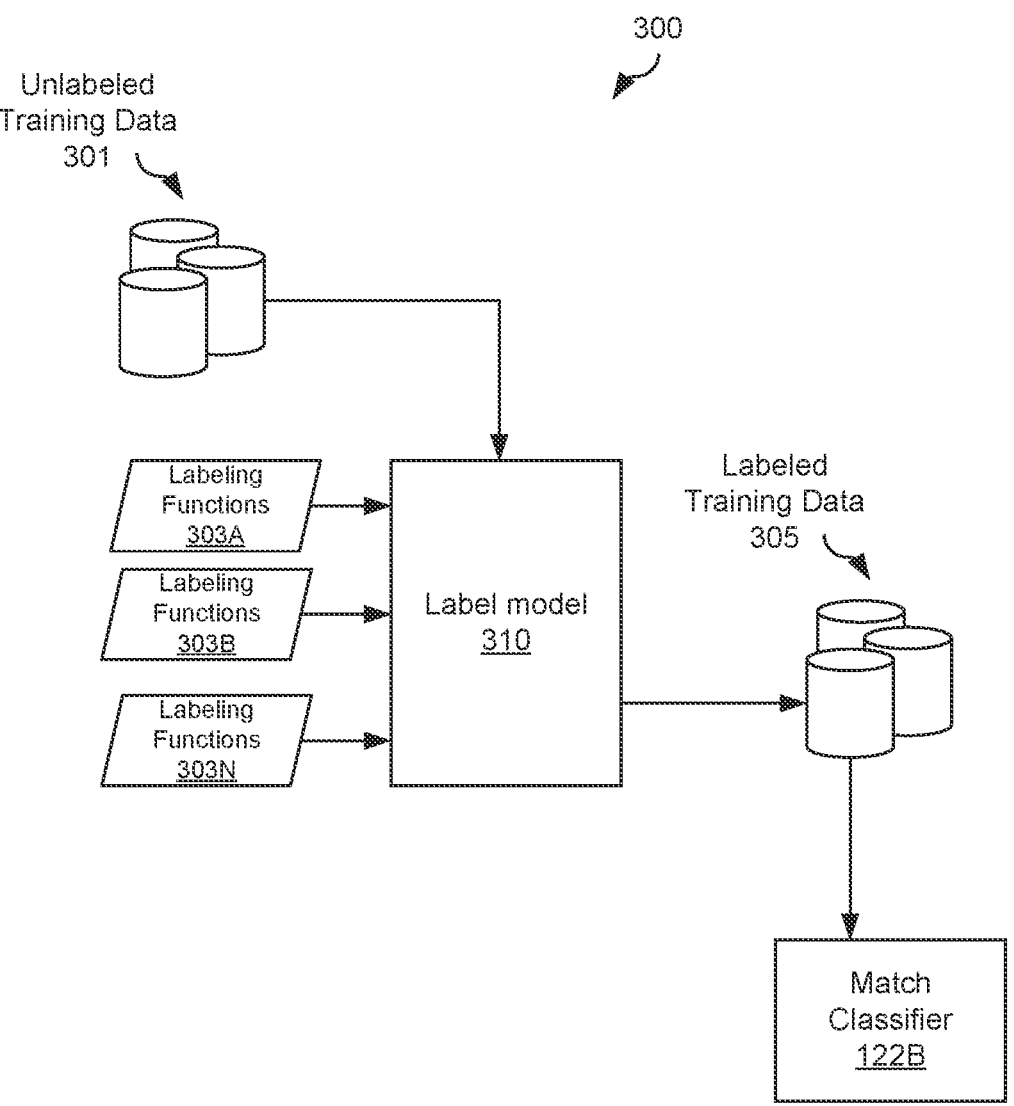
FIG. 3 illustrates a schematic example of a match classifier trained with weak supervision based on labeling functions and a label model that generates labels.

The match classifiers 122 may each be trained using modeling techniques such as gradient boosting (in particular examples, Gradient Boosting Machines (GBM), XGBoost, LightGBM, or CatBoost). Gradient boosting is a machine learning ("ML") technique for regression and classification problems, which produces a prediction model in the form of an ensemble of weak prediction models, typically decision trees. GBM may build a model in a stage-wise fashion and generalizes the model by allowing optimization of an arbitrary differentiable loss function. GBM may operate on categories/sub-categories of features, making it suited for the features 112 described herein. However, other ML techniques may be used as well, such as neural networks. A neural network, such as a recursive neural network, may refer to a computational learning system that uses a network of neurons to translate a data input of one form into a desired output. A neuron may refer to an electronic processing node implemented as a computer function, such as one or more computations. The neurons of the neural network may be arranged into layers. Each neuron of a layer may receive as input a raw value, apply a classifier weight to the raw value, and generate an output via an activation function. The activation function may include a log-sigmoid function, hyperbolic tangent, Heaviside, Gaussian, SoftMax function and/or other types of activation functions. Some of the match classifiers 122 may be trained via ensemble-based training 121A with labeled training data, an example of which is illustrated in FIG. 2. Some of the match classifiers 122 may be trained via weak supervision 121B, which automatically generates labeled training data from unlabeled training data, an example of which is illustrated in FIG. 3. Still other match classifiers 122 may be trained via other learning algorithms 121N.

The match classifications 124A-N may be aggregated by the model aggregation subsystem 130 to determine an aggregate match classification 134. The model aggregation subsystem 130 may aggregate the match classifications 124A-N based on various aggregation modes such as validation, aggregate metric, voting, and/or other aggregation techniques. In a validation mode of operation, the model aggregation subsystem 130 may aggregate the match classifications 124A-N based on a priority hierarchy. For example, the model aggregation subsystem 130 may rank the match classifiers 122A-N with respect to one another. The ranking may be configured by an operator of the system. In this example, the model aggregation subsystem 130 may validate the match classification 124 of a higher-ranked match classifier 122 with the match classification 124 of a lower-ranked match classifier 122 (or vice versa). In some of these examples, a match is determined only when a match classification 124A is validated by another match classification 124B. In the aggregate metric mode, the model aggregation subsystem 130 may aggregate the match classifications 124A-N based on an aggregate value such as a mean or median. In this mode, each of the match classifications 124 are output as a numeric probability of a match or mismatch and the model aggregation subsystem 130 may generate the aggregate match classification 134 by determining a mean or median of the output probabilities. In a voting mode of operation, the model aggregation subsystem 130 may determine the aggregate match classification 134 based on a majority rules vote of the match classifications 124. For match classifications 124 that are probabilistic outputs, the model aggregation subsystem 130 may convert the probability output to a binary class and count the binary classes. In this mode, the majority rules is a value defining a proportion of match classifications 124 that agree that a match between two or more match candidates is predicted. The proportion may be a simple majority (greater than 50%) or another value configured by the system operator.

In operation, each of the match classifications 124A-N may be monitored to determine whether the prediction was correct. For example, a subject matter expert may determine that a pair of match candidates 105 was correctly predicted as a match, which may be fed back to retrain one or more of the match classifiers 122 to improve their performance. For example, the data associated with the correct classification, such as the features, pairs of match candidates, and/or other data may be fed back into the training dataset to retrain one or more of the match classifiers 122. In this way, outputs of the execution and operation of the match classifiers 122 may be fed back to further improve modeling performance.

FIG. 2 illustrates a schematic example 200 of a match classifier 122A trained and executed via ensemble model learning. In this example, the match classifier 122A is itself an ensemble of models and ensemble modeling illustrated in FIG. 1 includes an ensemble of (i) an ensemble of models and (ii) at least one other model, which may also be ensembled or not. In particular, the match classifier 122A may include an ensemble of decisions trees 220A-N trained via gradient boosting such as XGBoost, LightGBM, or CatBoost. In gradient boosting, a loss function such as gradient descent is used to minimize errors between sequentially trained decision trees 220.

Each decision tree 220 is conceptually represented in a tree-like structure that is traversed from a root node (illustrated as a single top-most circle) to internal nodes (illustrated as middle circles). At the end is a leaf node (illustrated as bottom-most circles). Each leaf node may be associated with a class label that corresponds to a match classification. Two match classes are illustrated in FIG. 2: m=0 indicating a mismatch and m=1 indicating a match. Thus, at the end of each decision branch, a match classification is reached for a given decision tree 220. It should be noted that the leaf node may be a probability of a match, rather than being a distinct class.

Each root or internal node may be a split point that dictates the direction of traversal down the decision tree 220. Each split point may be associated with one or more features 112A that are evaluated to determine the direction of traversal. For example, the decision tree 220 is traversed from the parent node to a leaf node based on a split point that includes a binary test based on the feature Jaccard Distance (JD): if JD<x (where x is a predefined and/or updated value) then traverse down the tree to the left child node, otherwise traverse right. Filled circles represent traversal down the decision tree 220 to a leaf node. Each child node may itself have a split point based on its own set of one or more features 112A, which may be different than other features used at other nodes. To illustrate, the left child node may have a split point based on the feature "Cosine Distance" and the right child node may have a split point based on the feature "Common Bigrams Count." The tree traversal process is repeated until a leaf node is reached. The number of levels of nodes is referred to as a "depth."

To construct a decision tree 220, a machine learning platform may determine a node configuration, which places different features 112A at different nodes. For example, the machine learning platform may apply reduction in variance, information gain, Gini impurity, chi-square, and/or other tree splitting techniques. The decision trees 220A-N may be trained using labeled training data 201, which includes data labeled by SMEs. For example, the labeled training data 201 may include a plurality of pairs of match candidates (and/or the features derived from them) associated with a label that indicates whether the pair is known to be a match or mismatch. For each pair of match candidates in the labeled training data 201, the feature generation subsystem 110 may have generated one or more features 112A, examples of which are listed in Table 1. A feature 112A may be associated with a match label based on the pair of match candidates from which the feature 112A was derived. The decision trees 220 may be trained by splitting the labeled training data 201 into subsets based on an attribute value test. This process is repeated on each derived subset in a recursive manner. The recursion is completed when the subset at a node has the same value of the target variable, or when splitting no longer adds value to the predictions.

In gradient boosting, the decision trees 220 may be sequentially trained based on the labeled training data 201. For example, a decision tree 220A may be trained based on at least a subset of the features 112A using a first set of samples from the labeled training data 201. The first set of samples may be randomly selected from the labeled training data 201. An error function may estimate the residual ($R_1$), or error, from the decision tree 220A. An ensembler 210 may provide $R_1$ back to the decision tree 220A for adjusting its node evaluations and provide $R_1$ for training the decision tree 220B using the same or different features 112A and a different set of samples from the training dataset. That is, the decision tree 220B is trained after the decision tree 220A based on the residual $R_1$ from the decision tree 220A. The decision tree 220B may result in a residual $R_2$, which is fed back to all decision trees 220A and 220B for adjusting their node evaluations. This process may continue through decision tree 220N and $R_N$ until a minimum loss is achieved (which may be predefined), when the decision trees accurately predict the expected match classifications is achieved, and/or when a maximum number of iterations configured by a user has been met.

Gradient boosting and XGBoost in particular is well-suited for match classifications of match candidates. This is because each decision tree 220 is trained on its specific dataset and/or set of features, enabling them to complement one another as well as learn from their errors. Gradient boosting may mitigate against the previously noted variability in the content of the match candidates that may render some of the features 112 accurate for some datasets but not others. For example, the Edit Distance may be good at measuring similarity of strings even with typographical errors or omitted portions of strings while a Direct Match feature may be too stringent for similarity detection. Thus, some features 112 will perform well for some datasets but not others. Gradient boosting and XGBoost in particular may mitigate against the variance by tuning an ensemble of decision trees 220 that each are fine-tuned by iterative and sequential training on different subsets of the training data, in which each subset exhibits different variation characteristics. One of the key features of XGBoost is its efficient handling of missing values, which allows it to handle real-world data with missing values without requiring significant pre-processing. Additionally, XGBoost has built-in support for parallel processing, making it possible to train models on large datasets in a reasonable amount of time.

FIG. 3 illustrates a schematic example 300 of a match classifier 122122B trained with weak supervision based on labeling functions 303 and a label model 310 that generates labels. Weak supervision is an approach to machine learning in which labeled training sets are generated through one or more labeling functions 303 instead of manual annotation by subject matter experts. Weak supervision may yield more scalable, faster labeling and discovery of potentially important features that correlate with matches or mismatches. Labeling functions 303 may be provided to platforms that facilitate learning based on weak supervision, such as SNORKEL, UIPATH, and V7, among others.

A labeling function 303 is computational logic that evaluates input data and assigns a label to the input data based on the evaluation. The label may include a match label corresponding to a match class or a mismatch label corresponding to a mismatch class. The computational logic may include executable instructions that specifically programs the computer to label input data for training the match classifier 122B. The computational logic may be encoded in the form of computational rules, software instructions, hardware instructions, and/or other instructions that are executable by the computer.

Each labeling function 303 may specify criteria used to identify a label for that input data. For example, a labeling function 303 may include one or more conditional statements that specify the label classes. For binary (two-class) classification, the conditional statements may be an if-then logical construct. In this example, if a first condition is satisfied, then a first label (such as a match label) is assigned to the data. If the first condition is not satisfied, then a second label (such as a mismatch label) is assigned to the data. In some examples, multiple conditional statements may map to a particular class. For example, if the first condition is not satisfied, but a second condition different than the condition is satisfied, then the first label may still be assigned to the data. As an example, the foregoing multiple condition may be implemented via an if-elseif-then logical construct. A labeling function 303 may include such conditional logic for one or more of the features illustrated in Table 1. For example, a labeling function 303 may specify that if the edit distance between two match candidates is >x, then assign a match label to the two match candidates, otherwise assign a mismatch label. In the foregoing, x is a predefined edit distance threshold value that may be configured by a subject matter expert. The labeling function 303 may include multiple conditions for multiple features. For example, a labeling function 303 may specify that if the edit distance is >x and the Jaccard distance is <y, then assign a match label to the two match candidates, otherwise assign a mismatch label. In the foregoing example, y is a predefined Jaccard distance threshold value that may be configured by a subject matter expert. Other numbers and combinations of features (such as from Table 1) may be used to configure a labeling function 303.

To leverage weak supervision, a plurality of labeling functions 303 may be used in combination with one another to label each data point (such as pair of match candidates) of the unlabeled training data 301. Each of the labeling functions 303 may use the same or different features and/or conditions as other combined labeling functions 303. When a plurality of labeling functions 303 are used, the output labels of some labeling functions 303 may agree while others may disagree. The variability of output labeling performance enables discovery of features that may be important for match classification, improving the performance of the match classifier 122B. For example, a first set of labeling functions 303 may result in a match label for typographical errors while a second set of labeling functions 303 may result in a mismatch label for the same typographical errors.

The label model 310 may itself be trained to identify sets of labeling functions 303 that provide accurate classes in the training dataset based on the variability of output labeling performance. For example, during training, if the first set of labeling functions 303 correctly labels the data (because the data is known to be matched), then the label model 310 may learn to trust that set of labeling functions 303 when they agree. In the foregoing example, the label model 310 may learn to trust the output of the first set of labeling functions 303 when they agree on a certain label, even if other labeling functions 303, such as the second set of labeling functions 303 disagree with that label. Other types of variations in the unstructured match candidates may be similarly detected and more accurately labeled. In this way, the label model

310 may be trained to learn which labeling functions 303 to trust and/or the situations in which to trust the labeling functions.

Based on the foregoing, the label model 310 may rapidly generate labeled training data 305 from unlabeled training data 301. It should be noted that, in some examples, the same training data from the training dataset used to train the match classifier 122A may be used without the labels. For example, a training dataset of match candidates may be labeled for supervised or semi-supervised training of the match classifier 122A. The same training dataset, unlabeled, may be used as input to the label model 310 for automatically labeling the same training dataset for training the match classifier 122B. In this way, when both the match classifier 122A (using labeled training data) and the match classifier 122B (using weak supervision) are ensembled, the benefit of using labeled training data may be leveraged together with the automatically generated labels from weak supervision. For example, both SME knowledge used to generate high quality labels for supervised training and the larger sets of automatically machine-learned labels from weak supervision may be used to train respective classifiers that are ensembled together. In further examples, some of the training data may be manually labeled by subject matter experts while unlabeled training data may be labeled based on the labeling functions 303 and the label model 310. Once the training dataset has been labeled based on the labeling functions 303 and the label model 310, the match classifier 122B may be trained based on the labeled training dataset. For example, the match classifier 122B may then be trained using one or more machine learning techniques such as gradient boosting, neural networks such as Long short-term memory (LSTM), and/or other machine learning techniques.

FIG. 4 illustrates an example of a method 400 of match classification based on ensembling an ensemble of models (such as the match classifier 122A illustrated in FIG. 2) and at least one other model (such as the match classifier 122B illustrated in FIG. 3).

At 402, the method 400 may include accessing a first match candidate and a second match candidate. The first match candidate and the second match candidate may each include unstructured content, such as a string, at least a portion of which includes characters that can encode various data about an entity. Each of the first and second match candidates may include variable data due to the unstructured content, errors, and/or other sources of data variation.

At 404, the method 400 may include generating, based on the first match candidate and the second match candidate, one or more first features (such as features 112A) and one or more second features (such as features 112B). The first and/or the second features may each include one or more of the features illustrated in Table 1. In some examples, the first features are different than the second features. In some examples, at least one feature is included in both the first features and the second features. In some examples, the first features and the second features do not share any common features.

At 406, the method 400 may include classifying, by a first match classifier (such as a match classifier 122A illustrated in FIGS. 1 and 2), the first match candidate and the second match candidate into a first match classification that indicates whether a match or mismatch is predicted between the first match candidate and the second match candidate based on the one or more first features. The first match classifier comprises an ensemble of models (such as decision trees 220A-N) trained via supervised learning with already-labeled first training data (such as labeled training data 201) to generate the first match classification.

At 408, the method 400 may include classifying, by a second match classifier (such as a match classifier 122B illustrated in FIGS. 1 and 3), the first match candidate and the second match candidate into a second match classification that indicates whether the match or mismatch is predicted between the first match candidate and the second match candidate based on the one or more second features. The second match classifier is trained via weak supervision with second labeled training data that is automatically labeled from unlabeled training data 301 based on a label model 310 itself trained with one or more labeling functions 303 to generate second labeled training data (such as labeled training data 305).

At 410, the method 400 may include generating an aggregate match classification 134 based on the first match classification and the second match classification. At 412, the method 400 may include determining whether the first match candidate and the second match candidate are matched based on the aggregate match classification.

Figure 5:
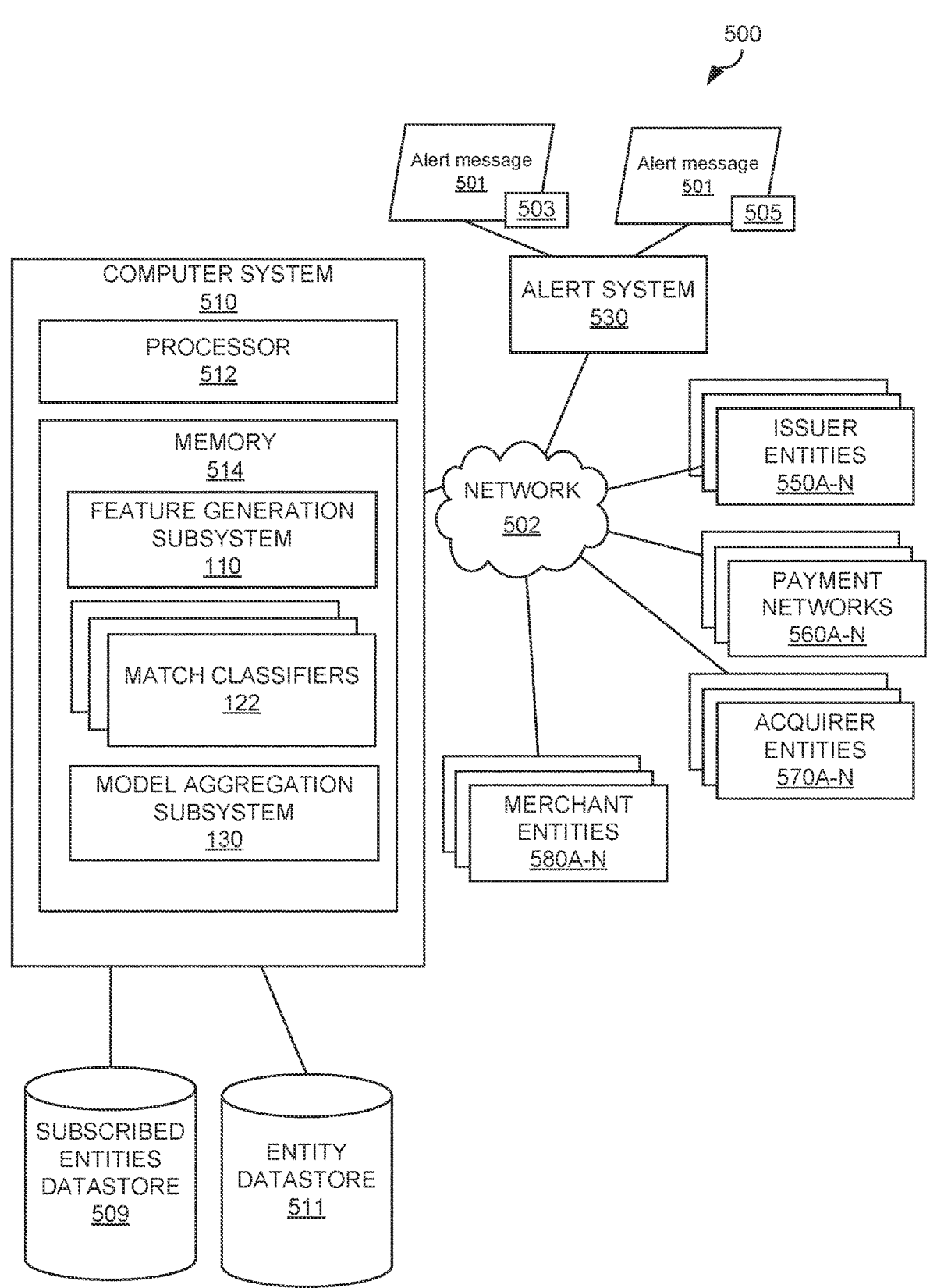
FIG. 5 illustrates an example of a computer environment 500 for implementing ensembled models for match classifications.

FIG. 5 illustrates an example of a computer environment 500 for implementing ensembled models for match classifications. The system environment 500 may include a computer system 510, an alert system 530, issuer entities 550 (illustrated as issuer entities 550A-N), payment networks 560 (illustrated as payment networks 560A-N), acquirer entities 570 (illustrated as acquirer entities 570A-N), merchant entities 580 (illustrated as merchant entities 580A-N), and/or other features. At least some of the components of the system environment 500 may be connected to one another via a network 502, which may include the Internet, an intranet, a Personal Area Network, a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 500 components may communicate.

The alert system 530 may receive and share alert messages 501 among a network of entities. An alert message 501 is electronic data that indicates an anomalous state that should be investigated, mitigated, or otherwise resolved by an entity in the network of entities. To share an alert message 501, the alert system 530 may identify the relevant entity that should act on the anomalous state and transmit an alert message 501 to the identified entity.

For example, in an electronic payment context, the network of entities may include issuer entities 550A-N, acquirer entities 570A-N and merchant entities 580A-N. An alert message 501 may indicate a transaction submitted through a payment network 560 should be rejected, mitigated, and/or investigated by an entity such as a merchant. In this example, an alert message 501 may include a descriptor 503 that identifies a merchant entity 580. In a network security context, an alert message 501 may indicate a potential network intrusion event that should be contained, mitigated, and/or investigated by an entity such as a network administrator. In this example, an alert message 501 may include a descriptor 503 that identifies a particular network administrator or system to alert the administrator of a potential network intrusion event. The alert system 530 may implement other types of alert contexts.

In some instances, the alert system 530 may be unable to identify the relevant entity based on a descriptor 503 encoded by an alert message 501. To illustrate, an example in the electronic payment context will be elaborated. When an issuer entity 550 detects suspicious activity such as fraud relating to a transaction at a merchant entity 580 using one of its issued accounts (such as when a credit card or other payment method linked to an issued account is used at the merchant entity 580), the issuer entity 550 may transmit an alert message 501 to the alert system 530. The alert message 501 may include a descriptor 503, a card acceptor name, and/or other information relating to the transaction. The descriptor 503 may describe a party requesting payment and may include a string that is presented on an account statement provided to the account holder. The descriptor 503 is intended to provide information about the party requesting payment so that the account holder can recognize the transaction. The card acceptor name may include a name of the merchant entity 580 that requested payment from the issuer entity 550.

Responsive to the alert message 501, the alert system 530 may identify the merchant entity 580 by looking up the descriptor 503 and/or the card acceptor name in an internal subscribed entities datastore 509 that stores identities of entities that have subscribed to receive and/or share alert messages 501. The alert system 530 may transmit an alert to the identified merchant entity 580 indicating the suspicious activity. In response, the merchant entity 580 may intervene by cancelling the transaction or refunding an amount of the transaction to avoid chargeback processing from the account holder.

The merchant entity 580 may report the interventive action or other information to the alert system 530. The refund may be initiated by the merchant entity 580 through its acquirer entity 570, which may submit a refund transaction to the appropriate payment network 560. Because such refunds generally occur within a specified time after the transaction (and alert from the issuer entity 550 was transmitted), refunds occurring within a threshold time period may be deemed to be related to the original alert. The threshold time period may be set to the length of time it usually takes for a payment transaction to reach settlement, typically 24 to 48 hours, although other threshold time periods may be used.

In some instances, the alert system 530 may not recognize the descriptor 503 and/or the card acceptor name. This may be because the merchant entity 580 is unknown to the alert system 530 such as when the merchant entity 580 has not subscribed to receive alert messages 501, the descriptor 503 and/or the card acceptor name have changed, the merchant entity 580 is using a new descriptor 503, and/or other reasons. In many of these examples, the descriptor 503 contains information that may be used to identify the merchant entity 580. However, the descriptor 503 may be unstructured and therefore difficult to match with previously stored information of known entities such as known merchant entities 580.

The unstructured format of descriptors 503 may make it difficult for a computer system to decode descriptors 503 in a consistent manner. Furthermore, a given descriptor 503 may be unrecognized because it is new, has not otherwise been used before, has errors, and/or other issues. As a result, it may be difficult to computationally match a particular descriptor 503 to descriptors of known entities. A descriptor that is not recognized as identifying a known entity, such as a known merchant entity 580, will be referred to as an "unmatched descriptor" 505. The alert system 530 may be unable to transmit an alert message 501 having an unmatched descriptor 505 to the relevant entity because the relevant entity is not identifiable based on the unmatched descriptor 505. On the other hand, an alert message 501 having a descriptor 503 will be transmitted to a merchant entity 580 that is identified by the descriptor 503.

To mitigate against these and other issues, the computer system 510 may include one or more computing devices that attempt to match the unmatched descriptor 505 with identifying information of a known entity, for which data records (including an identifier of the known entity that serves as a match candidate) may be stored in an entity datastore 511. In this example, the unmatched descriptor 505 and the identifying information are match candidates for which the feature generation subsystem 110 generates features and the match classifiers 122 are ensembled to generate an aggregate match classification.

In particular, the one or more computing devices of the computer system 510 may each include a processor 512 a memory 514, and/or other components. The processor 512 may be a semiconductor-based microprocessor, a central processing unit (CPU), an application specific integrated circuit (ASIC), a field-programmable gate array (FPGA), and/or other suitable hardware device. Although the computer system 510 has been depicted as including a single processor 512, it should be understood that the computer system 510 may include multiple processors, multiple cores, or the like. The memory 514 may be an electronic, magnetic, optical, or other physical storage device that includes or stores executable instructions. The memory 514 may be, for example, Random Access memory (RAM), an Electrically Erasable Programmable Read-Only Memory (EEPROM), a storage device, an optical disc, and the like. The memory 514 may be a non-transitory machine-readable storage medium, where the term "non-transitory" does not encompass transitory propagating signals. The memory 514 may store a feature generation subsystem 110, match classifiers 122, and an aggregation subsystem 130 that may each be executed by the processor 5122.

Figure 6:
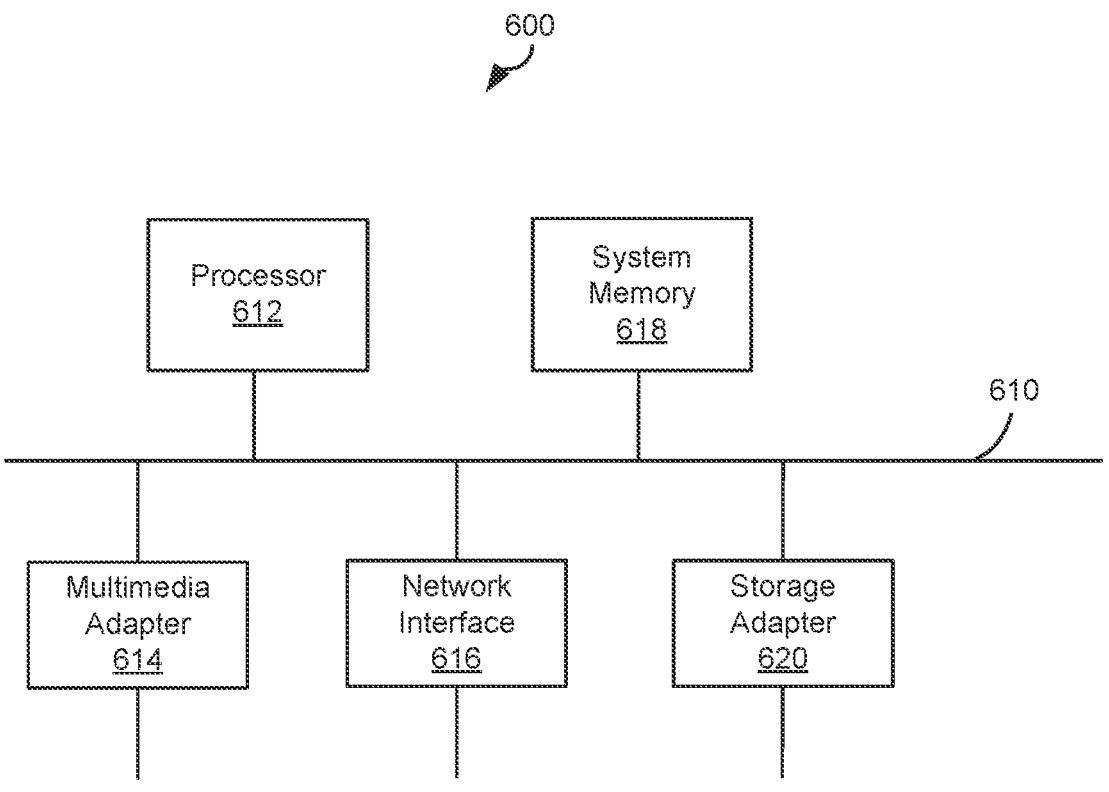
FIG. 6 illustrates an example of a computer system that may be implemented by components illustrated in FIGS. 1-3 and 5.

FIG. 6 illustrates an example of a computer system 600 that may be implemented by any of the components described in FIGS. 1-3 and 5. The computer system 600 may include, among other things, an interconnect 610, a processor 612, a multimedia adapter 614, a network interface 616, a system memory 618, and a storage adapter 620.

The interconnect 610 may interconnect various subsystems, elements, and/or components of the computer system 600. As shown, the interconnect 610 may be an abstraction that may represent any one or more separate physical buses, point-to-point connections, or both, connected by appropriate bridges, adapters, or controllers. In some examples, the interconnect 610 may include a system bus, a peripheral component interconnect (PCI) bus or PCI-Express bus, a HyperTransport or industry standard architecture (ISA)) bus, a small computer system interface (SCPI) bus, a universal serial bus (USB), IIC (I2C) bus, or an Institute of Electrical and Electronics Engineers (IEEE) standard 1384 bus, or "firewire," or other similar interconnection element.

In some examples, the interconnect 610 may allow data communication between the processor 612 and system memory 618, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 612 may control operations of the computer system 600. In some examples, the processor 612 may do so by executing instructions such as software or firmware stored in system memory 618 or other data via the storage adapter 620. In some examples, the processor 612 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 614 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 616 may provide the computer system 600 with an ability to communicate with a variety of remote devices over a network. The network interface 616 may include, for example, an Ethernet adapter, a Fibre Channel adapter, and/or other wired- or wireless-enabled adapter. The network interface 616 may provide a direct or indirect connection from one network element to another and facilitate communication and between various network elements. The storage adapter 620 may connect to a standard computer readable medium for storage and/or retrieval of information, such as a fixed disk drive (internal or external).

In some examples, a computer system may perform match classification based on output of the ensemble of models 120 alone, output of the match classifier 122 alone, or both outputs. When both outputs are used, a match classification outputted by the ensemble of models 120 may be validated by the output of the match classifier 122.

Other devices, components, elements, or subsystems (not illustrated) may be connected in a similar manner to the interconnect 610 or via a network. The devices and subsystems can be interconnected in different ways from that shown in FIG. 6. Instructions to implement various examples and implementations described herein may be stored in computer-readable storage media such as one or more of system memory 618 or other storage. Instructions to implement the present disclosure may also be received via one or more interfaces and stored in memory. The operating system provided on computer system 600 may be MS-DOS®, MS-WINDOWS®, OS/2®, OS X®, IOS®, ANDROID®, UNIX®, Linux®, or another operating system.

Although illustrated as using ensembled approaches, in some implementations, each classifier 122 may be executed individually to make a match classification. For example, the match classifier 122A illustrated in FIG. 2 (which is itself an example of an ensemble model) may generate a match classification that is used alone to determine whether match candidates are matched. Likewise, the match classifier 122B illustrated in FIG. 3 may generate a match classification that is used alone to determine whether match candidates are matched.

The term "model" may refer to computer functions that provide functionality described with respect to that model. Such functionality may be "automatic" in that the model may provide such functionality without human intervention. Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "122A-N" does not refer to a particular number of instances of 122A-N, but rather "two or more."

The databases (such as the data structures 101, 109, 111, 509, 511) may be, include, or interface to, for example, an Oracle™ relational database sold commercially by Oracle Corporation. Other databases, such as Informix™, DB2 or other data storage, including file-based (such as spreadsheet or extensible markup language documents), or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for ensembling an ensemble of models and at least one other model for match classification, comprising:
   a processor programmed to:
      access a first match candidate and a second match candidate;
      generate, based on the first match candidate and the second match candidate, one or more first features and one or more second features;
      classify, by a first match classifier, the first match candidate and the second match candidate into a first match classification that indicates whether a match or mismatch is predicted between the first match candidate and the second match candidate based on the one or more first features;
      wherein the first match classifier comprises an ensemble of models trained via supervised learning with already-labeled first training data to generate the first match classification;

classify, by a second match classifier, the first match candidate and the second match candidate into a second match classification that indicates whether the match or mismatch is predicted between the first match candidate and the second match candidate based on the one or more second features,
   wherein the second match classifier is trained via weak supervision with second labeled training data that is automatically labeled from unlabeled training data based on a label model itself trained with one or more labeling functions to generate second labeled training data;
   generate an aggregate match classification based on the first match classification and the second match classification; and
   determine whether the first match candidate and the second match candidate are matched based on the aggregate match classification.

2. The system of claim 1, wherein to classify the first match candidate and the second match candidate into the first match classification, the processor is further programmed to:
   execute an ensemble of decision trees that each generate a respective match classification that is ensembled to generate the first match classification.

3. The system of claim 1, wherein the processor is further programmed to:
   access the one or more labeling functions;
   train the label model based on the one or more labeling functions; and
   generate the labeled training data to train the second match classifier.

4. The system of claim 1, wherein the first match candidate comprises a first string and the second match candidate comprises a second string.

5. The system of claim 4, wherein to generate the one or more first features, the processor is further programmed to:
   generate a similarity metric between the first string and the second string, wherein the similarity metric comprises a non-binary quantitative value that indicates a level of similarity between the first string and the second string.

6. The system of claim 4, wherein to generate the one or more first features, the processor is further programmed to:
   generate a binary metric that indicates whether or not the first string and the second string have in common one or more characters.

7. The system of claim 6, wherein to generate the binary metric, the processor is further programmed to:
   determine whether the first string and the second string have an exact match.

8. The system of claim 6, wherein to generate the binary metric, the processor is further programmed to:
   segment the first string into a first plurality of words and the second string into a second plurality of words;
   for each first word from among the first plurality of words:
      determine whether an initial letter of each first word matches an initial letter of a corresponding second word in the second plurality of words to determine whether a first acronym of the first plurality of words is the same as a second acronym of the second plurality of words.

9. The system of claim 4, wherein to generate the one or more second features, the processor is further programmed to:
   determine a Levenshtein distance between the first string and the second string.

10. The system of claim 1, wherein to generate the aggregate match classification, the processor is further programmed to:

determine that the first match classification indicates a match and then validating the match based on the second match classification.

11. The system of claim 1, wherein the first match candidate comprises a first name associated with an entity and the second match candidate comprises a second name associated with the entity or another entity.

12. A method, comprising:

accessing, by a processor, a first match candidate and a second match candidate;

generating, by the processor, based on the first match candidate and the second match candidate, one or more first features and one or more second features;

classifying, by the processor executing a first match classifier, the first match candidate and the second match candidate into a first match classification that indicates whether a match or mismatch is predicted between the first match candidate and the second match candidate based on the one or more first features, wherein the first match classifier comprises an ensemble of models trained via supervised learning with already-labeled first training data to generate the first match classification;

classifying, by the processor executing a second match classifier, the first match candidate and the second match candidate into a second match classification that indicates whether the match or mismatch is predicted between the first match candidate and the second match candidate based on the one or more second features, wherein the second match classifier is trained via weak supervision with second labeled training data that is automatically labeled from unlabeled training data based on a label model itself trained with one or more labeling functions to generate second labeled training data;

generating, by the processor, an aggregate match classification based on the first match classification and the second match classification; and determining, by the processor, whether the first match candidate and the second match candidate are matched based on the aggregate match classification.

13. The method of claim 12, wherein classifying the first match candidate and the second match candidate into the first match classification comprises:

executing an ensemble of decision trees that each generate a respective match classification that is ensembled to generate the first match classification.

14. The method of claim 12, further comprising:

accessing the one or more labeling functions;

training the label model based on the one or more labeling functions; and generating the labeled training data to train the second match classifier.

15. The method of claim 12, wherein the first match candidate comprises a first string and the second match candidate comprises a second string.

16. The method of claim 15, wherein generating the one or more first features comprises:

generating a similarity metric between the first string and the second string, wherein the similarity metric comprises a non-binary quantitative value that indicates a level of similarity between the first string and the second string.

17. The system of claim 1, wherein generating the aggregate match classification comprises:

determining that the first match classification indicates a match and then validating the match based on the second match classification.

18. A non-transitory computer readable medium storing instructions that, when executed by a processor, programs the processor to:

access a first match candidate and a second match candidate;

generate, based on the first match candidate and the second match candidate, one or more first features and one or more second features;

classify, by a first match classifier, the first match candidate and the second match candidate into a first match classification that indicates whether a match or mismatch is predicted between the first match candidate and the second match candidate based on the one or more first features, wherein the first match classifier comprises an ensemble of models trained via supervised learning with already-labeled first training data to generate the first match classification;

classify, by a second match classifier, the first match candidate and the second match candidate into a second match classification that indicates whether the match or mismatch is predicted between the first match candidate and the second match candidate based on the one or more second features, wherein the second match classifier is trained via weak supervision with second labeled training data that is automatically labeled from unlabeled training data based on a label model itself trained with one or more labeling functions to generate second labeled training data;

generate an aggregate match classification based on the first match classification and the second match classification; and determine whether the first match candidate and the second match candidate are matched based on the aggregate match classification.

19. The non-transitory computer readable medium of claim 18, wherein to classify the first match candidate and the second match candidate into the first match classification, the instructions when executed programs the processor to:

execute an ensemble of decision trees that each generate a respective match classification that is ensembled to generate the first match classification.

20. The non-transitory computer readable medium of claim 19, wherein the instructions when executed further programs the processor to:

access the one or more labeling functions;

train the label model based on the one or more labeling functions; and generate the labeled training data to train the second match classifier.

* * * * *